(12) United States Patent
Inoue

(10) Patent No.: US 11,176,084 B2
(45) Date of Patent: Nov. 16, 2021

(54) SIMD INSTRUCTION SORTING PRE-SORTED SOURCE REGISTER'S DATA ELEMENTS INTO A FIRST ASCENDING ORDER DESTINATION REGISTER AND A SECOND DESCENDING DESTINATION REGISTER

(71) Applicant: INTERNATIONAL BUSINESS MACHINES CORPORATION, Armonk, NY (US)

(72) Inventor: Hiroshi Inoue, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 15/808,208

(22) Filed: Nov. 9, 2017

(65) Prior Publication Data

US 2019/0138494 A1    May 9, 2019

(51) Int. Cl.
*G06F 9/30* (2018.01)
*G06F 15/80* (2006.01)
*G06F 7/36* (2006.01)

(52) U.S. Cl.
CPC ............ *G06F 15/8015* (2013.01); *G06F 7/36* (2013.01); *G06F 9/30021* (2013.01); *G06F 9/30032* (2013.01); *G06F 9/30036* (2013.01); *G06F 15/8053* (2013.01); *G06F 15/8092* (2013.01)

(58) Field of Classification Search
CPC .................................................. G06F 9/30036
See application file for complete search history.

(56) References Cited

U.S. PATENT DOCUMENTS

| 4,734,877 | A | * | 3/1988 | Sakata | ................. G06F 15/8053 708/441 |
| 5,091,848 | A | * | 2/1992 | Kojima | ..................... G06F 7/22 708/520 |
| 5,907,842 | A | * | 5/1999 | Mennemeier | ............. G06F 7/24 |
| 8,264,391 | B2 | | 9/2012 | Yanto et al. | |
| 9,665,542 | B2 | | 5/2017 | Kamath et al. | |

(Continued)

OTHER PUBLICATIONS

Ghhugani et al., "Efficient Implementation of Sorting on Multi-Core SIMD CPU Architecture," Proceedings of the VLDB Endowment. vol. 1, Issue 2. Aug. 1, 2008. pp. 1313-1324.

(Continued)

*Primary Examiner* — Jacob Petranek
(74) *Attorney, Agent, or Firm* — Tutunjian & Bitetto, P.C.; Randall Bluestone

(57) ABSTRACT

A computer-implemented method is provided for performing bitonic merge operations. The computer-implemented includes receiving a plurality of first values in a first hardware register from a first input stream in ascending order, receiving a plurality of second values in a second hardware register from a second input stream in descending order, performing a bitonic merge operation on the first and second values in the first and second hardware registers, and reversing comparison operations performed by one or more comparators in the bitonic merge operation, outputs of the one or more comparators being loaded into the second hardware register so that output values of the second hardware register are arranged in descending order and placed into an output stream.

17 Claims, 6 Drawing Sheets

(56) References Cited

U.S. PATENT DOCUMENTS

| | | |
|---|---|---|
| 9,740,659 B2 | 8/2017 | Sreedhar et al. |
| 9,766,888 B2* | 9/2017 | Gueron ............... G06F 9/30098 |
| 2008/0077768 A1* | 3/2008 | Inoue .................. G06F 9/30021 |
| | | 712/9 |
| 2014/0173225 A1 | 6/2014 | Chatterjee et al. |
| 2017/0039048 A1 | 2/2017 | Gschwind et al. |
| 2017/0068610 A1 | 3/2017 | Gschwind et al. |
| 2017/0168827 A1* | 6/2017 | Mishra ................ G06F 9/30021 |

OTHER PUBLICATIONS

Inoue et al., "AA-Sort: A New Parallel Sorting Algorithm for Multi-Core SIMD Processors," 16th International Conference on Parallel Architecture and Compilation Techniques. Sep. 15-19, 2007. pp. 1-10.

Rahman et al., "An experimental study of word-level parallelism in some sorting algorithms," Proceedings WAE. Aug. 20-22, 1998. pp. 193-203.

International Search Report/Written Opinion with cited art in corresponding International Patent Application No. PCT/IB2018/058364 dated Feb. 15, 2019.

\* cited by examiner

SIMD INSTRUCTION SORTING PRE-SORTED SOURCE REGISTER'S DATA ELEMENTS INTO A FIRST ASCENDING ORDER DESTINATION REGISTER AND A SECOND DESCENDING DESTINATION REGISTER

BACKGROUND

Technical Field

The present invention relates generally to information technology, and more specifically, to systems and methods for merging and sorting arrays on a Single Instruction Multiple Data (SIMD) processor.

Description of the Related Art

Sorting and merging of arrays is a common computing operation in a variety of applications pertaining to contexts such as databases, cognitive computing, graph searching, and speech recognition. An efficient sorting and merging kernel is commonly required for the performance of such applications, especially in instances where the arrays to be merged include as many as several trillion records. Accordingly, a need exists for scalable techniques for merging and sorting arrays on a processor.

SUMMARY

In accordance with one embodiment, a computer-implemented method for performing bitonic merge operations is provided. The computer-implemented method includes performing, by the processor, a bitonic merge operation on a plurality of first values received in a first hardware register from a first input stream in ascending order and a plurality of second values received in a second hardware register from a second input stream in descending order, the first and second hardware registers stored in a database, and reversing, by the processor, comparison operations performed by one or more comparators in the bitonic merge operation whose outputs are to be loaded into the second hardware register so that output values of the second hardware register are arranged in descending order and placed into an output stream.

In accordance with another embodiment, a system for performing bitonic merge operations is provided. The system includes a memory and at least one processor in communication with the memory, wherein the computer system is configured to receive a plurality of first values in a first hardware register from a first input stream in ascending order, receive a plurality of second values in a second hardware register from a second input stream in descending order, perform a bitonic merge operation on the first and second values in the first and second hardware registers, and reverse comparison operations performed by one or more comparators in the bitonic merge operation whose outputs are to be loaded into the second hardware register so that output values of the second hardware register are arranged in descending order and placed into an output stream.

In accordance with one embodiment, a non-transitory computer readable storage medium comprising a computer readable program for performing bitonic merge operations, wherein the computer readable program when executed on a computer causes the computer to perform the steps of performing, by the processor, a bitonic merge operation on a plurality of first values received in a first hardware register from a first input stream in ascending order and a plurality of second values received in a second hardware register from a second input stream in descending order, and reversing, by the processor, comparison operations performed by one or more comparators in the bitonic merge operation whose outputs are to be loaded into the second hardware register so that output values of the second hardware register are arranged in descending order and placed into an output stream.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
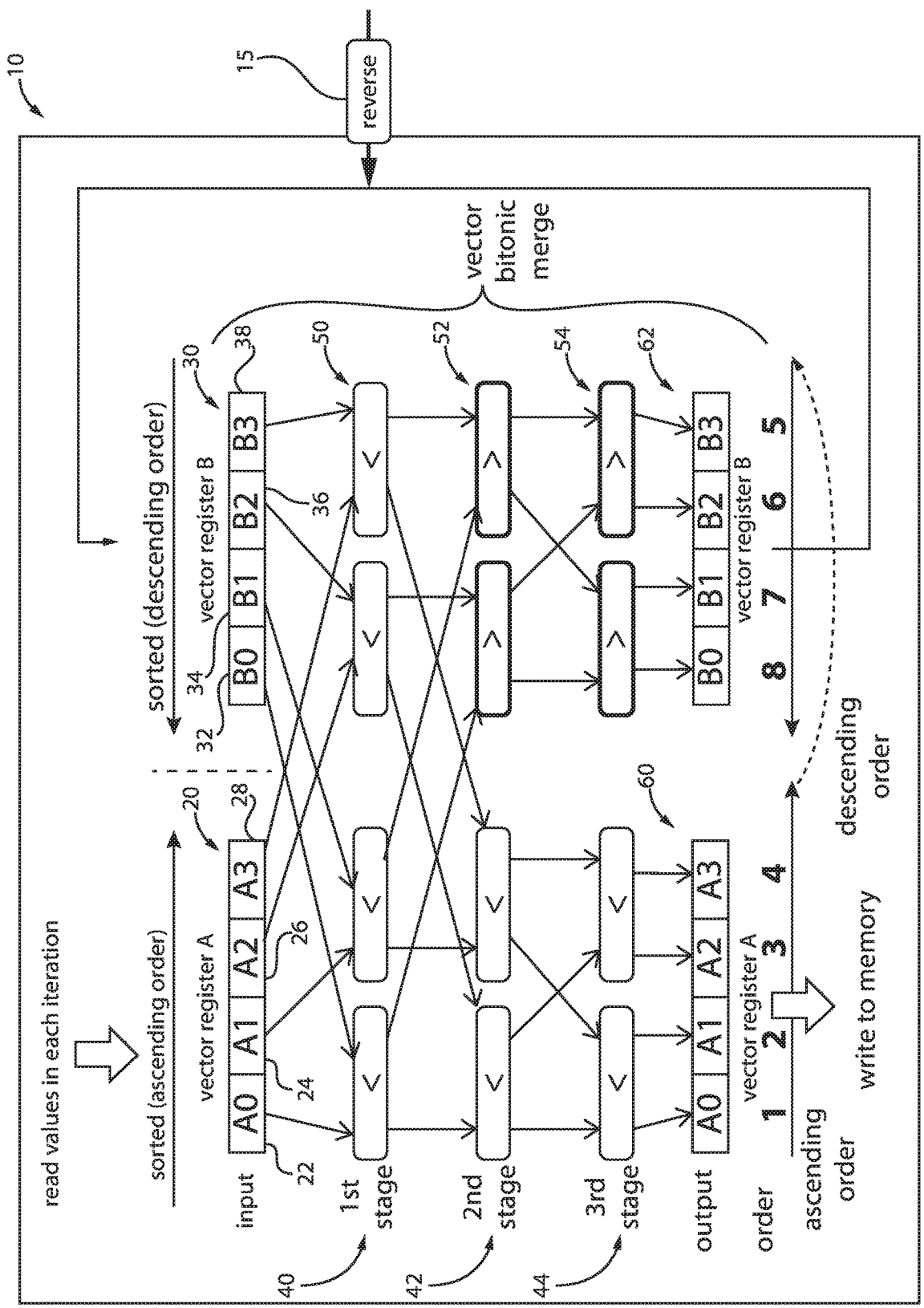
FIG. 1 is a block/flow diagram of an exemplary sorting module for performing bitonic merge operations, in accordance with an embodiment of the present invention.

Embodiments in accordance with the present invention provide methods and devices for merging and sorting arrays on a Single Instruction Multiple Data (SIMD) processor. A sorting algorithm is an algorithm that puts elements of a list in a certain order. Sorting is an integral component of most database management systems (DBMS) and data stream management systems (DSMS). Performance of DBMS and DSMS queries is dominated by cost of an associated sorting algorithm. Sorting can be both computationally intensive, as well as memory intensive. There are many different sorting algorithms. However, the sorting methodology disclosed uses single instruction multiple data (SIMD) instructions to calculate minimum and maximum values. Sorting is conducted by using a plurality of SIMD type processors of a graphic processing unit (GPU). The computational complexity is in the order of $O(N \log^2 N)$, where O represents the order of, and N represents the size of the list.

Embodiments in accordance with the present invention provide methods and devices for performing bitonic merge operations on SIMD processors. Bitonic merge or bitonic sort is a classic parallel algorithm for merging and sorting. Bitonic merge or bitonic sort focuses on converting a random sequence of numbers into a bitonic sequence, one that monotonically increases, then decreases. Bitonic sort performs $O(n \log^2 n)$ comparisons. The number of comparisons performed by bitonic sort are more than other sorting algorithms such as merge sort, which performs $O(n \log n)$ comparisons. Moreover, bitonic sort is useful for parallel implementation because elements are usually compared in predefined sequence and the sequence of comparison does not depend on data. Therefore, bitonic sort is suitable for implementation in hardware and parallel processor arrays. A sequence is called bitonic if it is first increasing, then decreasing. A sorted sequence is a monotonically non-decreasing (or non-increasing) sequence.

Embodiments in accordance with the present invention provide methods and devices for performing bitonic merge operations on SIMD processors by eliminating a reverse operation in each iteration. This is achieved by employing a modified bitonic merge operation that generates merged output in two vector registers, that is, in an ascending order in a first vector register and a descending order in a second vector register (in contrast to a conventional bitonic merge where values are sorted in an ascending order in both vector registers). This modification can be performed without additional execution cost by exchanging minimum and maximum instructions in comparisons.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Referring now to the drawings in which like numerals represent the same or similar elements and initially to FIG. 1, a block/flow diagram of an exemplary sorting module for performing bitonic merge operations is presented, in accordance with an embodiment of the present invention.

Figure 5:
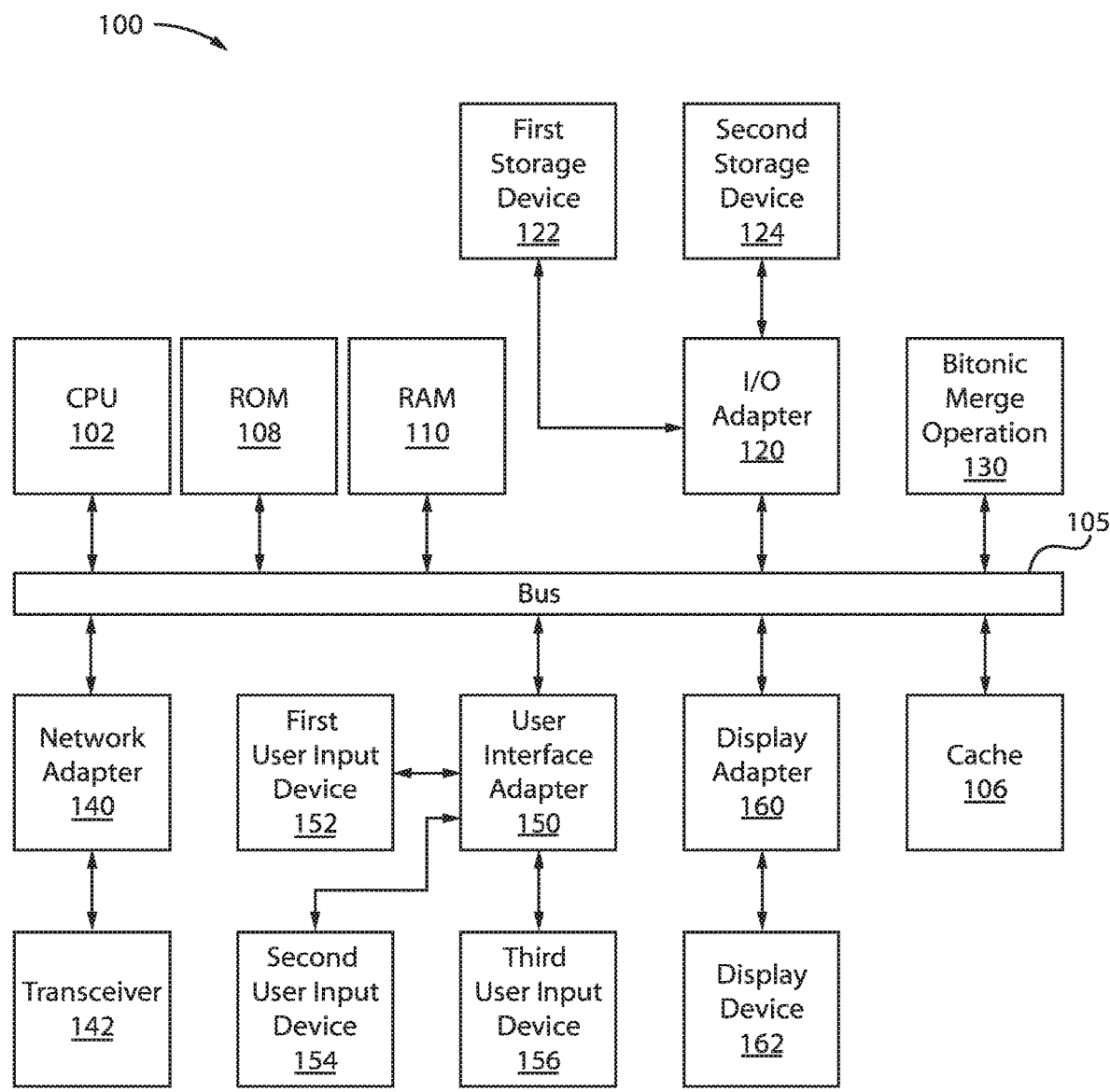
FIG. 5 is a block/flow diagram of an exemplary computing system performing bitonic merge operations, in accordance with an embodiment of the present invention.

A sorting module 10 can perform bitonic merge operations and can include a first vector or hardware register 20 and a second vector or hardware register 30. The sorting module 10 can be used to sort data values (also referred to as data words) that the sorting module 10 receives as input. The sorting module 10 can be an integrated circuit (IC) on board a computer processing chip (processor 102), or can be an off-chip circuit operatively connected to the processor 102 (FIG. 5). The sorting module 10 can also include one or more comparators 70, 72 (FIGS. 2 and 3), each separating a pair of adjacent storage elements in the hardware registers 20, 30. According to one embodiment, each comparator can be a digital binary comparator configured to perform a sort operation between data values stored in a pair of adjacent storage elements.

The first vector register 20 includes first input value 22 (A0), second input value 24 (A1), third input value 26 (A2), and fourth input value 28 (A3). The second vector register 30 includes first input value 32 (B0), second input value 34 (B1), third input value 36 (B2), and fourth input value 38 (B3).

In the first stage 40 of the first vector register 20, the first input value 22 (A0) is compared to the first input value 32 (B0), and the second input value 24 (A1) is compared to the second input value 34 (B1). The comparison is made to put the values in ascending order. The input values 22, 24, 26, 28 are received from a first input stream. The input values 32, 34, 36, 38 are received from a second input stream.

In the first stage 50 of the second vector register 30, the third input value 26 (A2) is compared to the third input value 36 (B2), and the fourth input value 28 (A3) is compared to the fourth input value 38 (B3). The comparison is made to put the values in ascending order.

Therefore, in the first stages 40, 50 of the first and second vector registers, respectively, the comparisons result in rearrangement of values in ascending order. In the bitonic merge 10, the first stages 40, 50 separate all values into a smaller half and a larger half. The minimum and maximum instructions in comparisons are exchanged for the larger half.

In the second stage 42 of the first vector register 20, the values A0, B0 are placed in ascending order and the values A1, B1 are placed in ascending order.

In the second stage 52 of the second vector register 30, the values A2, B2 are placed in descending order and the values A3, B3 are placed in descending order.

Therefore, in the second stages 42, 52 of the first and second hardware registers, respectively, the comparisons result in rearrangement of values in ascending order (first vector register 20) and descending order (second vector register 30).

In the third stage 44 of the first vector register 20, the values A0, B0, A1, B1 are placed in ascending order.

In the third stage 54 of the second vector register 30, the values A2, B2, A3, B3 are placed in descending order.

Therefore, in third second stages 44, 54 of the first and second hardware registers, respectively, the comparisons result in rearrangement of values in ascending order (first vector register 20) and descending order (second vector register 30).

The output 60 of the first hardware register 20 has values A0, A1, A2, A3 placed in ascending order (e.g., 1, 2, 3, 4), whereas the output 62 of the second hardware register 30 has values B0, B1, B2, B3 placed in descending order (e.g., 8, 7, 6, 5). The output 60 is placed into an output stream. The output stream can be stored, e.g., in memory 108, 110 (FIG. 5).

To reiterate, the bitonic merge operation 10 takes two vector registers 20, 30 as its input. The values (A0, A1, A2, A3) are sorted in the ascending order in the first vector register 20 and the values (B0, B1, B2, B3) are sorted in the descending order in the second hardware register 30. The bitonic merge operation 10 generates totally sorted output in two vector registers 60, 62, where the values are sorted in the ascending order in the first hardware register 60 and sorted in the descending order in the second hardware register 62 (as opposed to sorting in the ascending order in both registers as in conventional bitonic merge operations). Thus, there is no need to reverse values in the second vector register 30 in each iteration (e.g., in stages 52, 54). As a result, the reverse operation instruction is eliminated to improve computation.

The reverse operation is used in conventional systems since output values are sorted in ascending order (e.g., see element 62 in FIG. 1), but the input values need to be sorted in descending order. Thus, a reverse operation, which reorders values in one vector, is needed in conventional systems. The reverse operation is located in an inner-most loop and hence the reverse operation affects performance visibly. As a result, elimination of the reverse operation, in accordance with embodiments of the present invention, improves computation speed.

The modified bitonic merge operation generates merged output in two vector registers, that is, in the ascending order in the first vector register and in the descending order in the second vector register. This modification is performed without additional execution cost by exchanging minimum and maximum instruction comparisons in stages 52, 54. Since the output is already in descending order, there is no need for a reverse operation in each iteration. Only a reverse operation 15 can take place after the outputs 60, 62 of the first and second hardware registers 20, 30 have been formed.

The reverse operation 15 reorders values in one vector in reversed order. For example, if the input vector includes four values, that is [1, 5, 7, 12], the reverse operation then outputs [12, 7, 5, 1]. This operation can be executed by only one instruction on most conventional processors.

Figure 2:
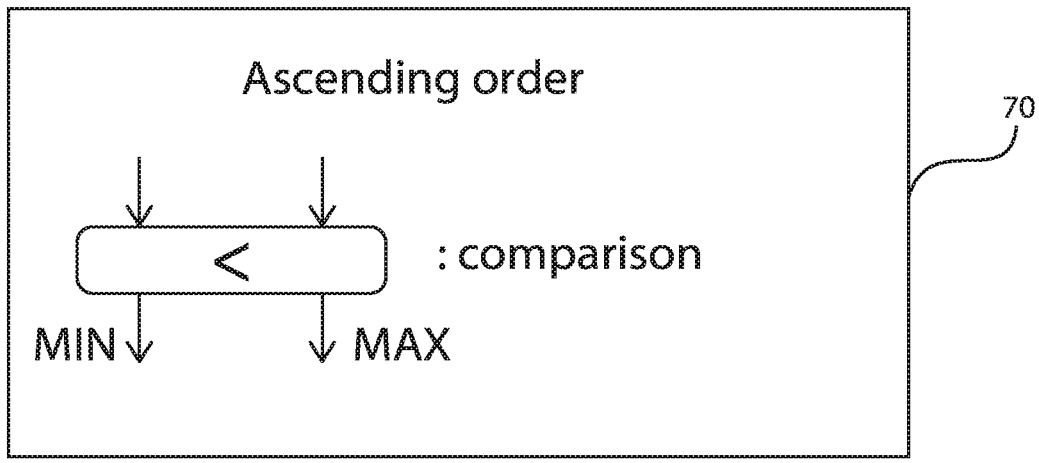
FIG. 2 is a block/flow diagram of an exemplary comparison unit for sorting data in ascending order, in accordance with an embodiment of the present invention.

FIG. 2 is a block/flow diagram of an exemplary comparison unit (or comparator) for sorting data in ascending order, in accordance with an embodiment of the present invention.

The ascending comparison block 70 is denoted by the symbol "<."

Two input values are received from two input lines. The comparison block 70 compares two values and outputs smaller values into a left output line and larger values into a right output line.

Figure 3:
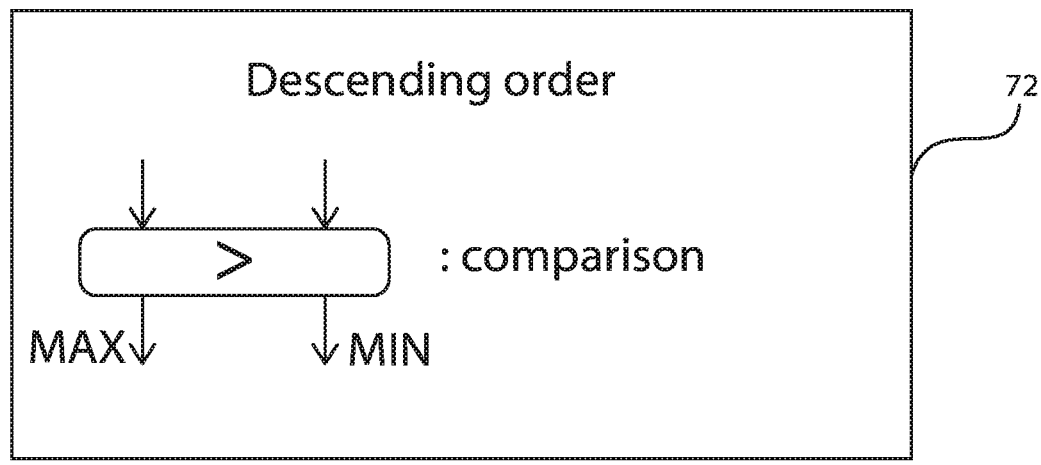
FIG. 3 is a block/flow diagram of an exemplary comparison unit for sorting data in descending order, in accordance with an embodiment of the present invention.

FIG. 3 is a block/flow diagram of an exemplary comparison unit (or comparator) for sorting data in descending order, in accordance with an embodiment of the present invention.

The descending comparison block 72 is denoted by the symbol ">."

Two input values are received from two input lines. The comparison block 72 compares two values and outputs smaller values into a right output line and larger values into a left output line.

Figure 4:
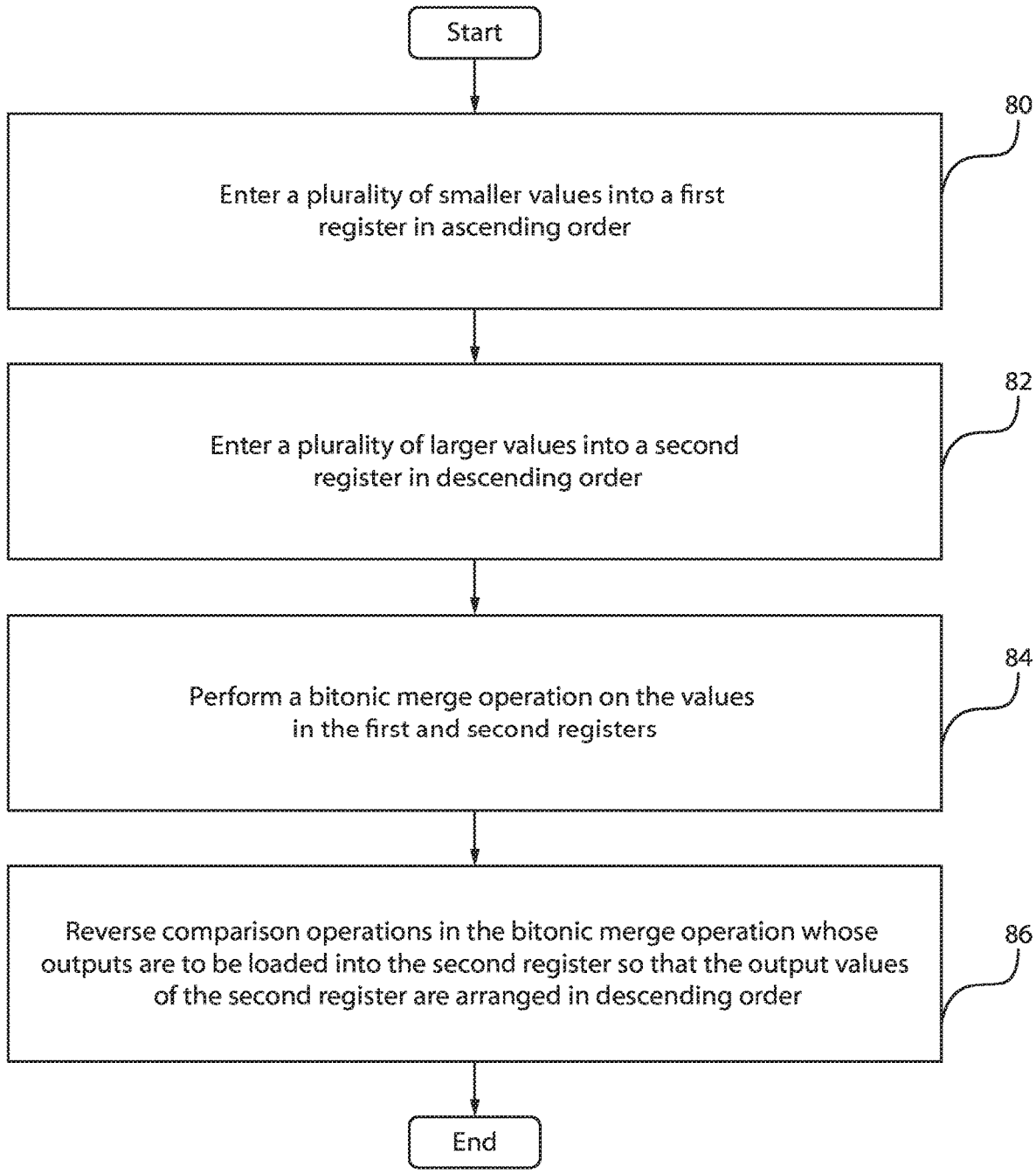
FIG. 4 is a block/flow diagram of an exemplary method for implementing the bitonic merge operation, in accordance with an embodiment of the present invention.

FIG. 4 is a block/flow diagram of an exemplary method for implementing the bitonic merge operation, in accordance with an embodiment of the present invention.

At block 80, a plurality of smaller values are received into a first hardware register in ascending order. The first hardware register is stored in a database. The first hardware register is a vector register. The plurality of smaller values are read in each iteration.

At block 82, a plurality of larger values are received into a second hardware register in descending order. The second hardware register is stored in a database. The second hardware register is a vector register. The plurality of larger values are read in each iteration.

At block 84, a bitonic merge operation is performed on the values in the first and second hardware registers stored in the database. The bitonic merge operation is performed by, e.g., a sorting/merging algorithm. The sorting/merging algorithm can be executed on processor 102 (FIG. 5).

At block 86, comparison operations in the bitonic merge operation whose outputs are to be loaded into the second hardware register are reversed so that output values of the second hardware register are arranged in descending order. The outputs of the bitonic merge operation are reversed only in the second hardware register. Additionally, the outputs are not necessarily reversed at every stage. For example, as shown in FIG. 1, the outputs are reversed in the second and third stages only.

Regarding FIGS. 1-4, the methods described herein can be used in various applications, such as, e.g., in IBM's mainframes and servers, which include SIMD architectures. One such mainframe can be, e.g., the z13 mainframe. The z13 platform brings to bear a new architectural extension with instructions that allow reduced processor quiesce effects, lower cache misses, lower pipeline disruption, and increased parallelism with instructions that process several operands in a single instruction. Such mainframe systems could substantially benefit from SIMD processors that eliminate the reverse operation step described herein. The z13 superscaler processor has 32 vector registers that include an instruction set containing 139 new instructions. The enhanced instruction set allows a better flow for increased number of operands to be processed in a single instruction. This is all intended to provide support for increased analytic processing. With the boom in big data and analytics, the SIMD processor of the exemplary embodiments of the present invention can increase computational speed of such mainframes and/or servers. SIMD instructions improve the performance of complex mathematical models as well as permitting the integration of business models and analytic workloads on z Systems or mainframes in general. This all spells speed of processing.

The 32 new vector registers each have 128 bits. The 139 new instructions work on string operations, vector floating point operations and vector integer operations. Each register has multiple data elements of a fixed size. The code in the instructions shows the data format and the size of the elements. The elements can be in byte (16 8-bit operands), halfword (eight 16-bit operands), word (four 32-bit operands), doubleword (two 64-bit operands) or quadword (one 128-bit operand). The collection of the elements in a register is called a vector. All of the enhancements to the notion of vector processing can be used for increased speed with the processing of analytics-based use cases in utilizing SIMD architecture, such as the one described in the exemplary embodiments of the present invention where the reverse operation is eliminated. This gives the ability to accelerate workloads by using new instructions that act on many data elements at once. This can even occur at the single instruction level. This can help an organization meet shrinking batch windows by increasing throughput times. This helps the workloads keep up with new incoming transactions and allows extraction of real-time insight from consumer and financial transactions.

Another benefit with the SIMD architecture of the exemplary embodiments is that it allows workloads from earlier z Systems servers to run unchanged on the z13 mainframe. Workloads can now also be changed and enabled for higher throughput with SIMD acceleration. The SIMD processor of the exemplary embodiments has some very interesting opportunities with processing applications related to analytics, as throughput is important to harvest the insight of the transaction. Analytic transactions can be run in close proximity to z Systems data with efficiency and maximum performance. This also increases programmer productivity when developing analytics workloads where speed and performance optimization is paramount.

Therefore, the SIMD architecture disclosed herein can either supplement current SIMD processors or replace current SIMD processors in order to optimize performance by eliminating the reverse operation step. The SIMD architecture described herein can also be used in graphics processing units (GPUs) and other types of 3D graphics processing implementations. Of course, one skilled in the art can contemplate incorporating the SIMD architecture described herein into any type of processing unit that can be incorporated into any type of computing system for any type of application without any limitation.

In summary, the exemplary embodiments of the present invention pertain to an improved efficiency in merging two or more streams of data. The exemplary embodiments of the present invention integrate any logical and/or mathematical and/or abstract operations into a practical application since they pertain to steps for providing a purposeful output for a specific purpose. For example, bitonic merge operations are performed for the specific purpose of improving sorting operations by eliminating at least one step, that is, a reverse operation step. Further, the invention provides an improvement in the technology of data merge and data sort processing since the invention provides distinguished processing which effectively and efficiently reduces merging and sorting time by completing computations faster and with more accuracy to reduce memory requirements of computing systems and to reduce execution costs throughout the computing system.

Thus, the exemplary embodiments do not pertain to general-purpose computer components that are added after the fact to a fundamental economic practice or mathematical equation, but are directed to a specific implementation of a solution to a problem in the software arts. In other words, the exemplary embodiments are effectively directed to the actual and concretely defined solution to the problem of improving sorting and merging operations by eliminating steps in the process, which results in faster computations, and in turn, results in better and more accurate system performance.

Consequently, the elements described herein are not abstract because they describe a particular set of steps that delineate the specific approach for sorting and merging data in bitonic merge operations. The exemplary embodiments of the present inventions are thus directed to an improvement in computer-related technology by allowing computer performance of a function not previously performable by a computer.

FIG. 5 is a block/flow diagram of an exemplary computing system performing bitonic merge operations, in accordance with an embodiment of the present invention.

An exemplary bitonic merge operations processing system 100 to which the present invention can be applied is shown in accordance with one embodiment. The bitonic merge operations processing system 100 includes at least one processor (CPU) 102 operatively coupled to other components via a system bus 105. The CPU 102 communicates with the sorting module 10 (FIG. 1) to perform the bitonic merge operations. A cache 106, a Read Only Memory (ROM) 108, a Random Access Memory (RAM) 110, an input/output (I/O) adapter 120, a bitonic merge operation block 130, a network adapter 140, a user interface adapter 150, and a display adapter 160, are operatively coupled to the system bus 105. Bitonic merge operations performed by the bitonic merge operation block 130 can be stored, e.g., in memory 108, 110.

A first storage device 122 and a second storage device 124 are operatively coupled to system bus 105 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. In one example, the storage devices 122 and 124 can store the first and second hardware registers 20, 30.

A transceiver 142 is operatively coupled to system bus 105 by network adapter 140.

A display device 162 is operatively coupled to system bus 105 by display adapter 160. The display device 162 can display a sequence of bitonic merge operations.

A first user input device 152, a second user input device 154, and a third user input device 156 are operatively coupled to system bus 105 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from bitonic merge operations processing system 100. The user input devices 152, 154, 156 can be used to feed the sorting module 10 (FIG. 1) with a plurality of values.

Of course, the bitonic merge operations processing system 100 can also include other elements (not shown), as readily contemplated by one of skill in the art, as well as omit certain elements. For example, various other input devices and/or output devices can be included in bitonic merge operations processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the bitonic merge operations processing system 100 are readily contemplated by one of ordinary skill in the art given the teachings of the present invention provided herein.

Figure 6:
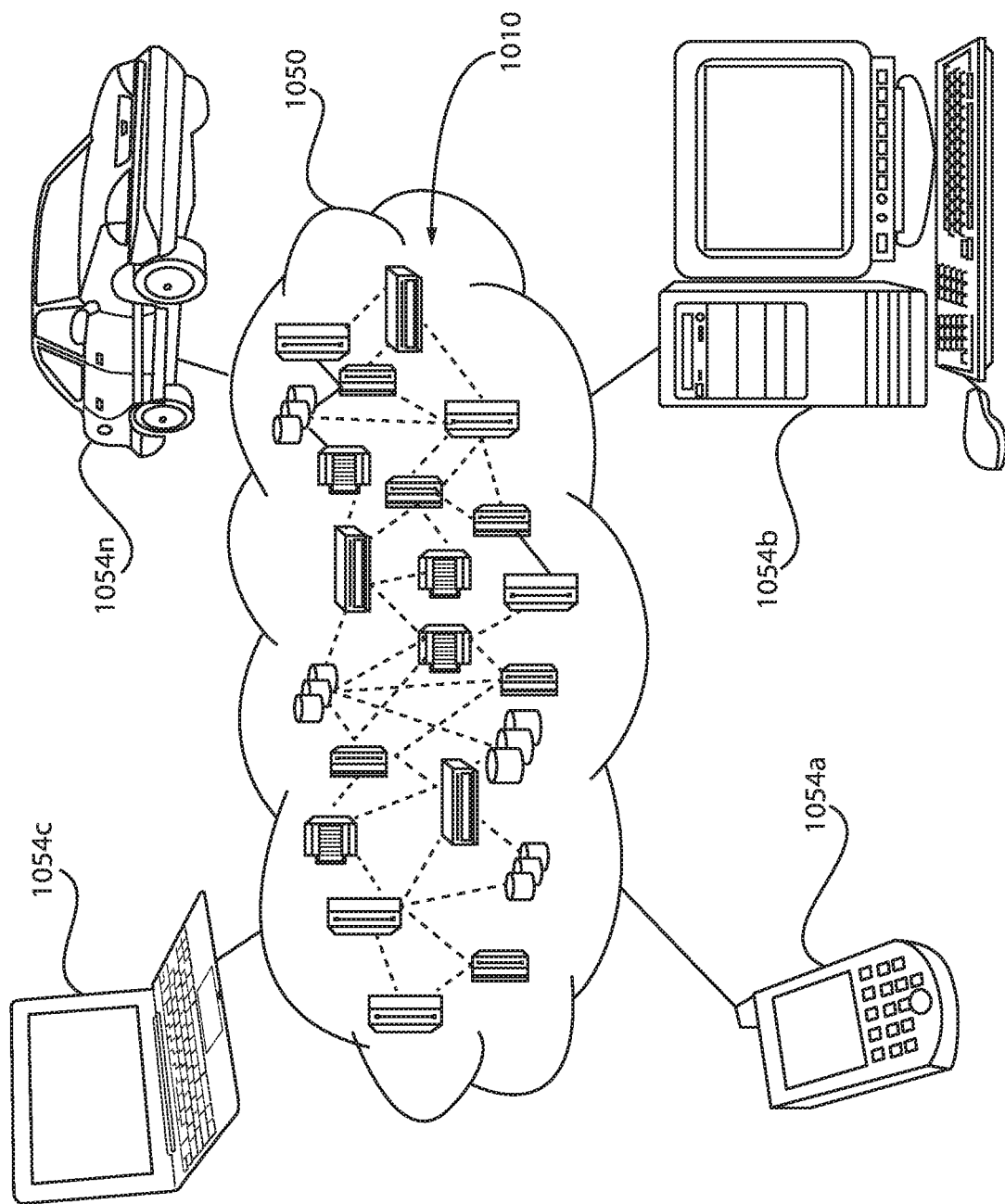
FIG. 6 is a block/flow diagram of an exemplary cloud computing environment, in accordance with an embodiment of the present invention.

FIG. 6 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 1050 is depicted for enabling use cases of the present invention. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N can communicate. Nodes 1010 can communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 6 are intended to be illustrative only and that computing nodes 1010 and cloud computing environment 1050 can communicate with any type of computerized device over any type of network and/or network addressable connection (e.g., using a web browser).

Figure 7:
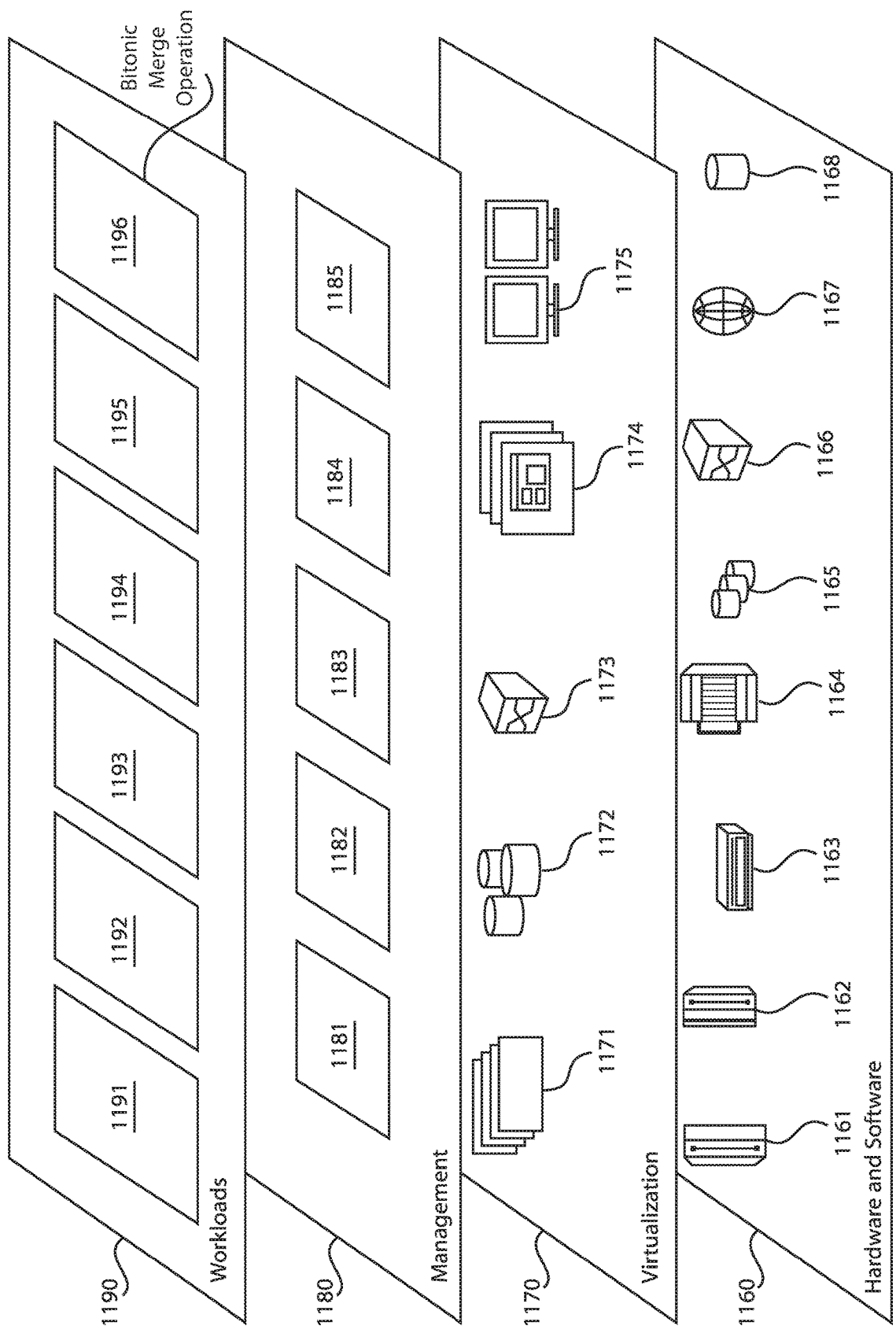
FIG. 7 is a schematic diagram of exemplary abstraction model layers, in accordance with an embodiment of the present invention.

FIG. 7 is a schematic diagram of exemplary abstraction model layers, in accordance with an embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities can be provided: virtual servers 1171; virtual storage 1172; virtual networks 1173, including virtual private networks; virtual applications and operating systems 1174; and virtual clients 1175.

In one example, management layer 1180 can provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and bitonic merge operations 1196.

Still yet, any of the components of the present invention could be created, integrated, hosted, maintained, deployed, managed, serviced, etc. by a service supplier who offers to provide a method for performing bitonic merge operations. Thus, the present invention describes a process for deploying, creating, integrating, hosting, maintaining, and/or integrating computing infrastructure, including integrating computer-readable code into the SIMD-based merge operation system 10 (FIG. 1), wherein the code in combination with the SIMD-based merge operation system 10 is capable of performing a method for performing bitonic merge operations. In another embodiment, the invention provides a business method that performs the process blocks/steps of the invention on a subscription, advertising, and/or fee basis. That is, a service supplier, such as a Solution Integrator, could offer to provide a method for performing bitonic merge operations. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions may also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for performing bitonic merge operations (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims:

The invention claimed is:

1. A computer-implemented method executed with a processor for performing merge operations by a sorting module, the method comprising:
   performing, by the processor, a merge operation on a plurality of smaller values received in a first hardware register from a first input stream in ascending order and a plurality of larger values received in a second hardware register from a second input stream in descending order; and
   reversing, by the processor, comparison operations performed by one or more comparators in the merge operation, outputs of the one or more comparators being loaded into the first and second hardware registers so that, concurrently, a first portion of the smaller value outputs are arranged in ascending order and a second portion of the larger value outputs are arranged in descending order and both outputs are concurrently placed into a single output stream.

2. The method of claim 1, wherein outputs of the comparison operations are reversed.

3. The method of claim 1, wherein a reverse operation instruction is prevented in each iteration.

4. The method of claim 1, wherein a reverse operation instruction is performed when the second values are read from a memory.

5. The method of claim 1, wherein the merge operations are implemented with Single Instruction Multiple Data (SIMD) instructions.

6. The method of claim 1, wherein the output values of the second hardware register are arranged in a different order than output values of the first hardware register.

7. A computer system for performing merge operations, the computer system comprising:
   a memory; and
   at least one processor in communication with the memory, wherein the computer system is configured to:
   perform, by the processor, a merge operation on a plurality of smaller values received in a first hardware register from a first input stream in ascending order and a plurality of larger values received in a second hardware register from a second input stream in descending order; and
   reverse, by the processor, comparison operations performed by one or more comparators in the merge operation, outputs of the one or more comparators being loaded into the first and second hardware registers so that, concurrently, a first portion of the smaller value outputs are arranged in ascending order and a second portion of the larger value outputs are arranged in descending order and both outputs are concurrently placed into a single output stream.

8. The computer system of claim 7, wherein outputs of the comparison operations are reversed.

9. The computer system of claim 7, wherein a reverse operation instruction is prevented in each iteration.

10. The computer system of claim 7, wherein a reverse operation instruction is performed when the second values are read from a memory.

11. The computer system of claim 7, wherein the merge operations are implemented with Single Instruction Multiple Data (SIMD) instructions.

12. The computer system of claim 7, wherein the output values of the second hardware register are arranged in a different order than output values of the first hardware register.

13. A non-transitory computer readable storage medium comprising a computer readable program for performing merge operations, wherein the computer readable program when executed on a computer causes the computer to perform the steps of:

performing, by the processor, a merge operation on a plurality of smaller values received in a first hardware register from a first input stream in ascending order and a plurality of larger values received in a second hardware register from a second input stream in descending order; and reversing, by the processor, comparison operations performed by one or more comparators in the merge operation, outputs of the one or more comparators being loaded into the first and second hardware registers so that, concurrently, a first portion of the smaller value outputs are arranged in ascending order and a second portion of the larger value outputs are arranged in descending order and both outputs are concurrently placed into a single output stream.

14. The computer readable storage medium of claim 13, wherein outputs of the comparison operations are reversed.

15. The computer readable storage medium of claim 13, wherein a reverse operation instruction is prevented in each iteration.

16. The computer readable storage medium of claim 13, wherein a reverse operation instruction is performed when the second values are read from a memory.

17. The computer readable storage medium of claim 13, wherein the merge operations are implemented with Single Instruction Multiple Data (SIMD) instructions.

* * * * *